Figures 1, 2:
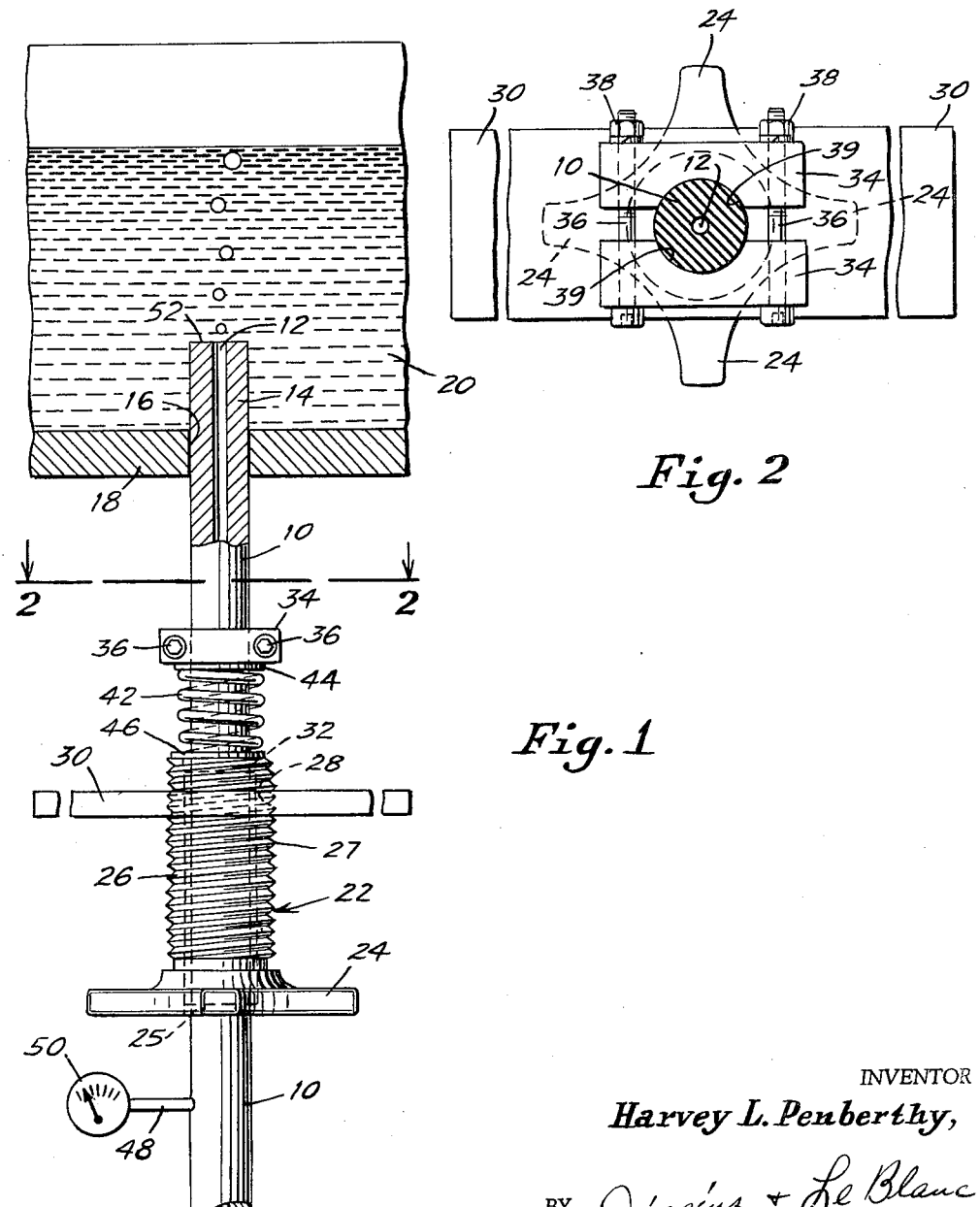

Sept. 14, 1965

H. L. PENBERTHY 3,206,291

METHOD OF REFINING GLASS

Filed Sept. 11, 1961

INVENTOR
*Harvey L. Penberthy,*

BY *Diggins + Le Blanc*

ATTORNEYS

United States Patent Office 3,206,291
Patented Sept. 14, 1965

3,206,291
METHOD OF REFINING GLASS
Harvey L. Penberthy, 5624 SW. Admiral Way,
Seattle, Wash.
Filed Sept. 11, 1961, Ser. No. 137,392
5 Claims. (Cl. 65—29)

This invention relates to glass furnaces and methods of glass manufacture and, more particularly, to a novel method and apparatus for producing homogeneous glass efficiently.

The manufacture of glass according to modern methods is carried out in continuous furnaces which are usually large and capable of containing many tons of the material which is to be melted and refined. The raw batch is introduced at one end of the furnace and is gradually melted and refined as it advances slowly lengthwise of the furnace. Heat for melting the batch and refining the molten glass is normally provided in the form of flames or gases of combustion applied to the surface of the material.

The heat efficiency of such furnaces in terms of heat utilized vs. heat applied is generally quite low, rarely exceeding 25% and sometimes being as low as 5%. In addition, it is frequently difficult to secure satisfactory glass homogeneity, a problem which is particularly troublesome when the product of the furnace is used to produce sheet glass.

One possible solution to the homogeneity and efficiency problems is found in the use of electric boosting units. While such systems work an improvement in the homogeneity and efficiency of the furnace, however, they necessitate the use of electric power which may not always be feasible in a given furnace installation and which, to at least a certain extent, involves the substitution of electric for combustion heating.

In order to overcome such problems, resort has been made to the use of bubbler units located at the bottom of the glass furnace, which bubbler units introduce streams of gas bubbles into the glass. The gas bubbles introduced are effectively able to pick up cold glass from the floor of the furnace and to carry it toward the surface of the molten glass, resulting in significantly improved glass homogeneity and effecting significant savings in cost of production.

Glass furnace systems illustrating the use of such bubbler units are fully disclosed in applicant's copending applications Serial Nos. 439,210, filed March 9, 1955, and 707,580, filed January 7, 1958. To the extent structural details are omitted in the description of the present invention which follows, such details are hereby incorporated by reference from the copending applications referred to.

When bubbler units are used in a glass furnace, a greatly increased movement of the glass in the furnace results. Under ordinary operating conditions, this movement of the glass removes the aluminous glass layer from the floor of the furnace anad carries it upwardly into the main body of the glass. This exposes the bottom blocks of the furnace to further attack by fresh glass, resulting in greatly decreased life of the bottom blocks. In fact, this process of wearing the bottom blocks thin can be extended to the point at which the furnace actually fails through leakage of the glass. This problem is especially severe around the bubbler tube locations.

In order to reduce the erosion of the floor of the furnace, it has been proposed to introduce the bubbling gas into the glass at a point above the floor of the furnace. This is accomplished through the use of elongated bubbler tubes which pass upwardly through holes in the furnace floor and which extend, in some cases, up to a point just below the surface of the molten glass in the furnace.

Unfortunately, however, the bubbler tubes in use today are not completely immune from attack by the molten glass and from slowly eroding away as a consequence. This creates a problem, since variations in the distance of the bubbler tube orifice beneath the surface of the molten glass is likely to have an adverse effect upon glass homogeneity. To overcome this problem, it is necessary to adjust the position of the bubbler tubes so as to maintain such tubes at a constant level below the surface of the glass mass in the furnace.

The adjustment of the bubbler tubes to maintain them at a relatively constant height with respect to the upper level of the glass mass, however, is not without its problems. More particularly, since the exact rate of erosion of the bubbler tubes by the glass is difficult to calculate accurately, the problem arises as to how to determine the height of the bubbler orifice above the floor of the furnace at any given moment without completely removing the tubes from the furnace. It is this last problem to which the present invention is directed: the present invention provides a means and a method to accurately determine the height of the bubbler tube orifice above the furnace bottom at any given time without removing the bubbler tube from the furnace.

It is accordingly a primary object of the present invention to provide a glass furnace which is capable of producing glass of improved homogeneity at reduced cost, as well as a method for using such improved furnace.

It is another primary object of the present invention to provide an improved glass furnace having a novel bubbler tube arrangement for improving the homogeneity of the glass produced by such furnace.

It is a further object of the present invention to provide a method for determining the extent to which bubbler tubes in a glass mass have been eroded so as to permit their adjustment to maintain constant the homogeneity of glass produced by a glass furnace.

It is still another object of the present invention to provide a means and a method to determine the extent of erosion of bubbler tubes in a glass furnace by means of the back-pressure exerted by the glass on the bubbler tubes, so as to maintain constant and improve the homogeneity of the glass produced by said furnace.

Another important object of the present invention is to provide a method and means for positioning a bubbler tube in a glass furnace at any desired height above the furnace floor using the back-pressure on said bubbler tube as a guide for such positioning.

These and other objects and advantages of the present invention will become more apparent upon reference to the ensuing description, claims and drawings wherein:

FIGURE 1 illustrates a front elevation, in partial section, of a glass furnace containing the improved bubbler structure of the present invention, with portions of the bubbler structure and furnace broken away for clarity of illustration; and FIGURE 2 is a sectional rawing taken along line 2—2 in FIGURE 1.

The novel structure and method of the present invention may best be described by reference to FIGURES 1 and 2. As shown therein the improved bubbler structure comprises a bubbler tube 10 having an orifice 12, the upper portion 14 of the bubbler tube passing through an aperture 16 in the floor 18 of a glass furnace containing molten glass 20. The bubbler tube is preferably made of an oxidation-resistant, high temperature alloy such as stainless steel, and the opening 16 in the floor 18 is sealed in a conventional manner to prevent egress of the molten glass 20 from the furnace.

Operatively connected to the bubbler tube 10 is a jack indicated generally at 22. Jack 22 comprises an X-shaped jack handle 24 which is positioned about bubbler tube 10, the slack between handle 24 and bubbler tube 10 being taken up by a bushing 25. Positioned above handle 24 and circumferentially around bubbler tube 10 is a jack screw 26 whose outer surface 27 is threaded, the threads of jack screw 26 engaging a tapped bore 28 in a base plate 30 which is anchored to the bottom beams (not shown) of the furnace in a conventional manner. The slack between the upper end of the interior of jack screw 26 and bubbler tube 10 is taken up by a bushing 32.

Clamped about bubbler tube 10 in a position spaced from the upper edge of jack screw 26 are a pair of split collars 34 which are connected together in a clamping arrangement about bubbler tube 10 by means of bolts 36 and nuts 38. Split collars 34 are each provided with an arcuate surface 39, the clamping action of bolts 36 and nuts 38 on split collars 34 urging the arcuate surfaces 39 tightly against bubbler tube 10.

Jack screw 26 is normally urged away from split collars 34 by means of a compression spring 42 positioned circumferentially about bubbler tube 10, washers 44 and 46 being respectively positioned between spring 42 and split collars 34 on the one hand and spring 42 and jack screw 26 on the other.

Connected to bubbler tube 10 at a point below handle 24 is a bleed conduit 48 which is, in turn, connected to a sensitive pressure gauge 50. Bubbler tube 10 is provided with a source of gas to be bubbled into the glass mass by conventional means (not shown) and suitable valves (not shown) are provided to adjust the flow of gas into the bubbler tube.

The novel structure described above is utilized in the following manner. The bubbler tube structure of the present invention is first installed in a glass furnace, the height of the top 52 of bubbler tube 10 above the floor 18 of the furnace being adjusted by means of jack 22 (rotation of handle 24 in the proper direction will cause jack screw 26 to move upwardly, exerting pressure on spring 42 and causing split collars 34 to lift bubbler tube 10) until it is at the level desired for normal operation of the furnace, for example 12 inches. Operation of the furnace is then commenced and the furnace charge heated to a molten condition by conventional means. Gas (e.g., air) is introduced into bubbler tube 10 and the rate of gas flow set at a predetermined level (e.g., the flow may be 1 cubic foot per hour) and a back-pressure reading taken on pressure gauge 50. This back-pressure reading is recorded and serves as a datum identifying the back-pressure at the selected flow rate for the constant height position desired for the bubbler tube 10. The furnace is then operated under normal conditions for an extended period of time.

Periodically, e.g., at 4 to 5 week intervals, a check is made to determine the extent to which bubbler tube 10 has eroded as a result of the action of the molten glass and, if necessary, the height of the tube adjusted to maintain constant its height above furnace floor 18.

This determination may be accomplished according to the present invention by again taking a back-pressure reading on pressure gauge 50 at the predetermined flow rate mentioned above and the reading compared to the datum back-pressure. If the back-pressure has increased, this is indicative of erosion of bubbler tube 10 and the consequent lessening of the height of the tube above furnace floor 18.

To restore the tube to its constant height position, bubbler tube 10 is raised by means of jack 22 until the back-pressure reading corresponds to the back-pressure datum previously recorded. At this point, bubbler tube 10 is at its constant height position and normal furnace operation may be restored. This process may be repeated, of course, to maintain a constant periodic check on the degree to which the bubbler tube has eroded and, consequently, to maintain constant the height of the tube above the furnace floor.

As an example of the present invention, the novel bubbler structure described above was installed in a glass furnace, operation of the furnace commenced, and a datum back-pressure reading using an air flow rate of 1 cubic foot per hour was taken with the top of the bubbler tube twelve inches above floor level. The back-pressure reading at this bubbler tube level was 2.1 p.s.i. (the back-pressure reading was taken at the control panel and, therefore, did not necessarily indicate the absolute back-pressure at the bubbler orifice).

After about 4 or 5 weeks of normal operation, with no adjustment having been made in the position of the bubbler tube, it was noticed upon the taking of a back-pressure reading at a gas pressure of 1 cubic foot per hour that the back-pressure on the bubbler tube line had increased to a point above 2.1 p.s.i. This was interpreted as being indicative of erosion of the bubbler tube by the glass, resulting in lessening the extent of protrusion above the furnace floor of the end of the bubbler tube to a height less than twelve inches. The height of the bubbler tube above the floor was then increased by means of the jack structure described above, the extent of the adjustment being such that the final back-pressure reading was 2.1 p.s.i., viz., the back-pressure corresponding to the original twelve-inch datum back-pressure reading. The normal operation of the furnace was then resumed. By repeating these determinations periodically, the bubbler tube was kept at the same height throughout the furnace campaign.

If desired the datum back-pressure reading need not be taken with a positive flow of gas passing through the bubbler tube. In lieu thereof, the gas flow rate may be reduced to zero and the datum back-pressure at the desired constant tube height calculated from basic physical data, such as glass density, etc. Alternatively, the datum constant height back-pressure may be calculated (by interpolation or extrapolation) from data for a plurality of tube heights, since the zero flow back-pressure will be substantially linear from a maximum at the furnace floor to zero at the surface of the molten mass in the furnace.

It will also be apparent from the foregoing description that the basic inventive concept of the instant application provides a method for accurately positioning a bubbler tube in a glass furnace at any desired height, constant or variable, by means of the back-pressure technique described. Thus, having obtained an original back-pressure value at a given gas flow rate (including zero or positive flow) at a given reference tube height position or positions, the position of the tube may be adjusted to a desired height different from the given height position by extrapolation or interpolation from said original back-pressure value to determine a datum back-pressure at said desired height. Thus, while the datum back-pressure is not always equal to the original back-pressure value, the original back-pressure is always used to determine the proper adjusted position of the tube.

As will be apparent from the foregoing description, the apparatus and method of the present invention provide a relatively simple means of maintaining constant the position of a bubbler tube in a glass furnace, notwithstanding progressive erosion of the tube, so as to improve the homogeneity of the glass produced by the furnace. The structure involved is relatively inexpensive and the manipulative steps required to operate the apparatus are minimal in number.

When used in the claims, the terms "given gas flow rate," "predetermined flow rate" and like terminology shall be construed to include not only a positive flow of gas but zero flow, as well.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a process of making glass in a glass furnace which contains at least one bubbler tube extending upwardly from the floor of the furnace into the molten furnace charge, a method of maintaining substantially constant the height of said bubbler tube above said furnace floor notwithstanding erosion of said tube by said charge, comprising: permitting a given gas flow rate through said tube with the tube at a given tube height so as to provide a back-pressure datum indicated on a pressure indicating means associated with said tube; and subsequently upon erosion of said tube adjusting the height of said tube above said furnace floor to restore the back-pressure at said given gas flow rate substantially to said back-pressure datum.

2. In a process of making glass in a glass furnace which contains at least one bubbler tube extending upwardly from the floor of the furnace into the molten furnace charge, and bubbler tube back-pressure indicating means associated with said tube, a method of maintaining substantially constant the height of said bubbler tube above said furnace floor notwithstanding erosion of said tube by said charge, comprising: setting the rate of gas flow through said tube and into the molten charge to a predetermined level; observing on said back-pressure indicating means the value of the back-pressure which would exist on said tube at said predetermined flow rate and with the tube at said constant tube height so as to provide a back-pressure datum at said constant height; operating said furnace for a period of time; observing on said back-pressure indicating means the back-pressure on said tube at said predetermined flow rate after said period of time has elapsed; and adjusting the height of said bubbler tube until the back-pressure at said predetermined flow rate corresponds to said back-pressure datum.

3. In a process of making glass in a glass furnace which contains at least one bubbler tube adjusted by extending upwardly from the floor of the furnace into the molten furnace charge, and bubbler tube back-pressure gauge means associated with said tube, the method of positioning the bubbler tube at a desired height above said furnace floor comprising: observing on said back-pressure gauge means the value of the back-pressure on said tube to provide a back-pressure datum; periodically adjusting the position of the tube to a height above said furnace floor at which said back-pressure datum may be observed on said back-pressure gauge means.

4. In a process of making glass in a glass furnace which contains at least one bubbler tube extending adjustably upwardly from the floor of the furnace into the molten furnace charge, and a bubbler tube back-pressure indicating means, the method of maintaining the position of a bubbler tube at a desired height above said furnace floor comprising: observing the back-pressure indicated on said back-pressure indicating means, adjusting said tube to a height above said furnace floor such that the observable back-pressure on said tube is substantially equal to a predetermined back-pressure on said tube at said desired height position.

5. In a process of making glass in a glass furnace which contains at least one bubbler tube extending adjustably upwardly from the floor of the furnace into the molten furnace charge, and a bubbler tube back-pressure indicating means, the method of positioning the bubbler tube at a desired height above said furnace floor comprising: observing on said back-pressure indicating means the value of the back-pressure which would exist on said tube at a given gas flow rate through said tube and with the tube at said desired height so as to provide a back-pressure datum at said desired height; and subsequently adjusting the height of said tube to said desired height above said furnace floor by observing the back-pressure on said tube at said given gas flow rate and adjusting the position of said tube until the observable back-pressure thereon is substantially equal to said back-pressure datum.

References Cited by the Examiner

UNITED STATES PATENTS

| | | | |
|---|---|---|---|
| 1,853,590 | 4/32 | Wefelschied | 266—34 |
| 2,387,222 | 10/45 | Wright | 65—135 XR |
| 2,636,914 | 4/53 | Arbeit | 65—342 XR |
| 3,015,190 | 1/62 | Arbeit | 65—134 |

FOREIGN PATENTS 1,148,862  7/57  France.

DONALL H. SYLVESTER, *Primary Examiner.*